United States Patent
Benhase et al.

(10) Patent No.: US 8,432,632 B2
(45) Date of Patent: *Apr. 30, 2013

(54) MAGNETIC DISK DRIVE USING A NON-VOLATILE STORAGE DEVICE AS CACHE FOR MODIFIED TRACKS

(75) Inventors: Michael T. Benhase, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,958

(22) Filed: May 23, 2011

(65) Prior Publication Data

US 2012/0300329 A1  Nov. 29, 2012

(51) Int. Cl.
*G11B 5/09* (2006.01)
(52) U.S. Cl.
USPC ............................. 360/39; 360/55; 360/73.01
(58) Field of Classification Search .................. None
See application file for complete search history.

(56) References Cited

U.S. PATENT DOCUMENTS

| | | | |
|---|---|---|---|
| 4,464,713 A | 8/1984 | Benhase et al. | |
| 4,878,135 A * | 10/1989 | Makino et al. | 360/78.04 |
| 5,734,861 A * | 3/1998 | Cohn et al. | 711/134 |
| 6,321,240 B1 | 11/2001 | Chilimbi et al. | |
| 7,107,385 B2 | 9/2006 | Rajan et al. | |
| 7,562,203 B2 | 7/2009 | Scott et al. | |
| 7,650,341 B1 | 1/2010 | Oratovsky et al. | |
| 7,669,022 B2 | 2/2010 | Maruyama et al. | |
| 7,698,501 B1 | 4/2010 | Corbett et al. | |
| 7,702,870 B2 | 4/2010 | English et al. | |
| 7,721,043 B2 | 5/2010 | Gill et al. | |
| 7,725,651 B2 | 5/2010 | Saito | |
| 7,930,325 B2 | 4/2011 | Siegwart et al. | |
| 7,965,465 B2 * | 6/2011 | Sanvido et al. | 360/60 |
| 7,981,533 B2 * | 7/2011 | Albrecht | 428/826 |
| 2003/0048578 A1 * | 3/2003 | Kikuchi et al. | 360/123 |
| 2004/0078508 A1 * | 4/2004 | Rivard | 711/4 |
| 2006/0106891 A1 | 5/2006 | Mahar et al. | |
| 2008/0002282 A1 * | 1/2008 | Lee | 360/77.04 |

(Continued)

OTHER PUBLICATIONS

"Check Point Copy for a Two Stage Store", IBM Corp., IP.com Document No. IPCOM000089366D,TDB Oct. 1977, pp. 1955-1958, Oct. 1, 1977, pp. 1-5.

(Continued)

*Primary Examiner* — Jason Olson
(74) *Attorney, Agent, or Firm* — David W. Victor; Konrad Raynes Davda & Victor LLP

(57) ABSTRACT

Provided are a computer program product, system, and method for a magnetic disk drive. The disk drive has at least one disk platter having at least one recordable disk surface having an areal density of at least 200 gigabits per square inch. Either a diameter of the at least one disk platter is greater than 3.5 inches or the at least one disk platter rotates at less than 5400 RPMs. A read/write head reads and writes tracks of data with respect to the at least one disk surface. Modified tracks from write requests to write to the at least one disk surface on the at least one disk platter are cached in a non-volatile storage device for caching modified tracks. Modified tracks are cached in the non-volatile storage device to later destage to the at least one disk surface.

16 Claims, 5 Drawing Sheets

U.S. PATENT DOCUMENTS

| | | |
|---|---|---|
| 2009/0271412 A1 | 10/2009 | Lacapra et al. |
| 2009/0271418 A1 | 10/2009 | Vaghani et al. |
| 2010/0082774 A1 | 4/2010 | Pitts |
| 2011/0087337 A1 | 4/2011 | Forsell |

OTHER PUBLICATIONS

"Serial ATA Native Command Queuing" joint WhitePaper by Intel Corporation and Seagate Technology, Jul. 2003, pp. 1-12.

"Multiple Command Control and Reordering", [online] [retrieved 051411], pp. 1-2 http://www.pcguide.com/ref/hdd/op/logicMultiple-c.html, 2011.

"Superparamagnetic Effect on Hard Disk Drive", [online] [retrieved 051611], pp. 1-2, http://www.dataclinic.co.uk/hard-disk-superparamagnetic-effect.html, 2011.

"Superparamagnetism", Wikipedia, [online] [retrieved 051911], pp. 1-5, http://en.wikipedia.org/w/index.php?title=Superparamagnetism&printable . . . , 2011.

"Seagate's Terabyte Platters Make it the Densest of the Lot", The Register, [online] [retrieved 051911], pp. 1-2, http://www.theregister.co.uk/2011/05/03seagate_terabyte_platter/ . . . , 2011.

Hitachi Demos 230 Gb Per Square Inch Data Density on Perpendicular Re . . . , [online] [retrieved 051911], pp. 1-9, http://www.physorg.com/news3588.html, 2011.

"Hard Disk Drive", Wikipedia, [online] [retrieved 051911], pp. 1-23, http://en.wikipedia.org/w/index.php?title=hard_disk_drive&printable=yes, 2011.

U.S. Appl. No. 13/113,974, filed May 23, 2011, by inventors M.Benhase, et al.

U.S. Appl. No. 13/113,931, filed May 23, 2011, by inventors M.Benhase, et al.

U.S. Appl. No. 13/113,937, filed May 23, 2011, by inventors K. Ash, et al.

U.S. Appl. No. 13/113,944, filed May 23, 2011, by inventors M.Benhase, et al.

U.S. Appl. No. 13/113,949, filed May 23, 2011, by inventors M.Benhase, et al.

U.S. Appl. No. 131113,953, filed May 23, 2011, by inventors M.Benhase, et al.

Preliminary Amendment, May 10, 2012, for U.S. Appl. No. 13/468,885, filed May 10, 2012 by M.T. Benhase et al., Total 11 pp.

U.S. Appl. No. 13/468,885, filed May 10 2012, entitled "Magnetic Disk Drive Using A Non-Volatile Storage Device as Cache for Modified Tracks", invented by Benhase, M.T. And L.M. Gupta, Total 25 pp.

U.S. Appl. No. 13/352,230, filed Jan. 17, 2012, entitled "Populating a First Stride of Tracks from a First Cache to Write to a Second Stride in a Second Cache", by inventors K. Ash, M. Benhase, L. Gupta, M. Kalos, and K. Nielsen, Total 34 pp.

U.S. Appl. No. 13/352,224, filed Jan. 17, 2012, entitled "Demoting Tracks from a First Cache to a Second Cache by Using an Occupancy of Valid Tracks in Strides in the Second Cache to Consolidate Strides in the Second Cache", by inventors M. Benhase, and L. Gupta, Total 37 pp.

U.S. Appl. No. 13/352,236, filed Jan. 17, 2012, entitled "Demoting Tracks from a First Cache to a Second Cache by Using a Stride Number Ordering of Strides in the Second Cache to Consolidate Strides in the Second Cache", by inventors M. Benhase, and L. Gupta, Total 39 pp.

U.S. Appl. No. 13/352,239, filed Jan. 17, 2012, entitled "Demoting Partial Tracks from a First Cache to a Second Cache", by inventors K. Ash, M. Benhase, and L. Gupta, Total 36 pp.

Notice of Allowance dated Dec. 28, 2012, pp. 1-7 for U.S. Appl. No. 13/468,885, filed May 10, 2012, by M.T. Benhase et al.

Office Action dated Jul. 26, 2012, pp. 1-19, for Serial No. filed May 10, 2012, by M.T. Benhase et al.

Response dated Oct. 26, 2012, pp. 1-7, to Office Action dated Jul. 26, 2012, pp. 1-19, for Serial No. filed May 10, 2012, by M.T. Benhase et al.

* cited by examiner

Non-Volatile Storage Control Block

Spatial Index Entry

MAGNETIC DISK DRIVE USING A NON-VOLATILE STORAGE DEVICE AS CACHE FOR MODIFIED TRACKS

BACKGROUND OF THE INVENTION

1. Field of the Invention

The present invention relates to a computer program product, system, and method for a magnetic disk drive using a non-volatile storage device as cache for modified tracks.

2. Description of the Related Art

Computer hard disk drives include one or more disks of magnetic storage medium and a disk drive head assembly to read and write data on the magnetic storage medium. Magnoresistive (MR) heads typically include a write element comprised of a thin film inductive head and a read element comprised of a sensor. MR heads for the disk surfaces of the disk drive are affixed to an actuator or arm that glides across the disk surface to position the head at different track locations. Current is passed to a voice coil motor (VCM) to position the actuator with respect to the disk surface. The amount of torque applied to the actuator is governed by the amount of current in the VCM. The VCM comprises the coil that receives the current and two magnets. During operations, the disk drive components, such as the VCM, can produce vibrations induced as a result of the resonance of the components. Such vibrations may result in undesirable head variations and tracking errors.

Data is stored on the disk surfaces in circular tracks on each disk surface that are thin concentric circular strips on a disk platter surface which comprise the magnetic medium to which data is written by the drive heads. These magnetic strips form a circle and are two-dimensional. In a disk drive system having multiple platters, a cylinder comprises the same circular track number on each platter, spanning all such tracks across each platter surface that is able to store data (without regard to whether or not the track is "bad"). Thus, it is a three-dimensional structure. Any circular track on one disk platter comprising part of a specific cylinder can be written to and read from while the actuator assembly remains stationary. Hard drive manufacturers have increased drive access speed increasing the number of platters which can be read at the same time. The circular tracks on a disk surface are divided into sectors, which are the smallest storage unit on a hard drive.

In the current art, disk diameters are generally maintained at 2.5 inches for laptops and 3.5 inches for desk top systems. Disk drive manufacturers want to reduce the disk diameter to reduce the seek time required to move the write head to different tracks on the disk surface. Further, to reduce latency, the time to rotate the disk to a particular sector, i.e., angular position on the cylinder, disk drive manufacturers increase the rotations per minute (RPMs) of the disks, to levels usually greater than 5400 RPMs. Further, disk drive manufacturers may limit the number of platters of disks to less than five to reduce vibration and other problems resulting from increasing the mass of the spinning disk drives.

There is a need in the art for improved configurations for hard disk drives.

SUMMARY

Provided are a computer program product, system, and method for a magnetic disk drive using a non-volatile storage device as cache for modified tracks. The disk drive has at least one disk platter having at least one recordable disk surface having an areal density of at least 200 gigabits per square inch, wherein either a diameter of the at least one disk platter is greater than 3.5 inches or the at least one disk platter rotates at less than 5400 RPMs. A read/write head is controlled to move with respect to the at least one disk platter to read and write tracks of data with respect to the at least one disk surface. Modified tracks from write requests to write to the at least one disk surface on the at least one disk platter are cached in a non-volatile storage device for caching modified tracks. Modified tracks are cached in the non-volatile storage device to later destage to the at least one disk surface.

DETAILED DESCRIPTION

Figure 1:
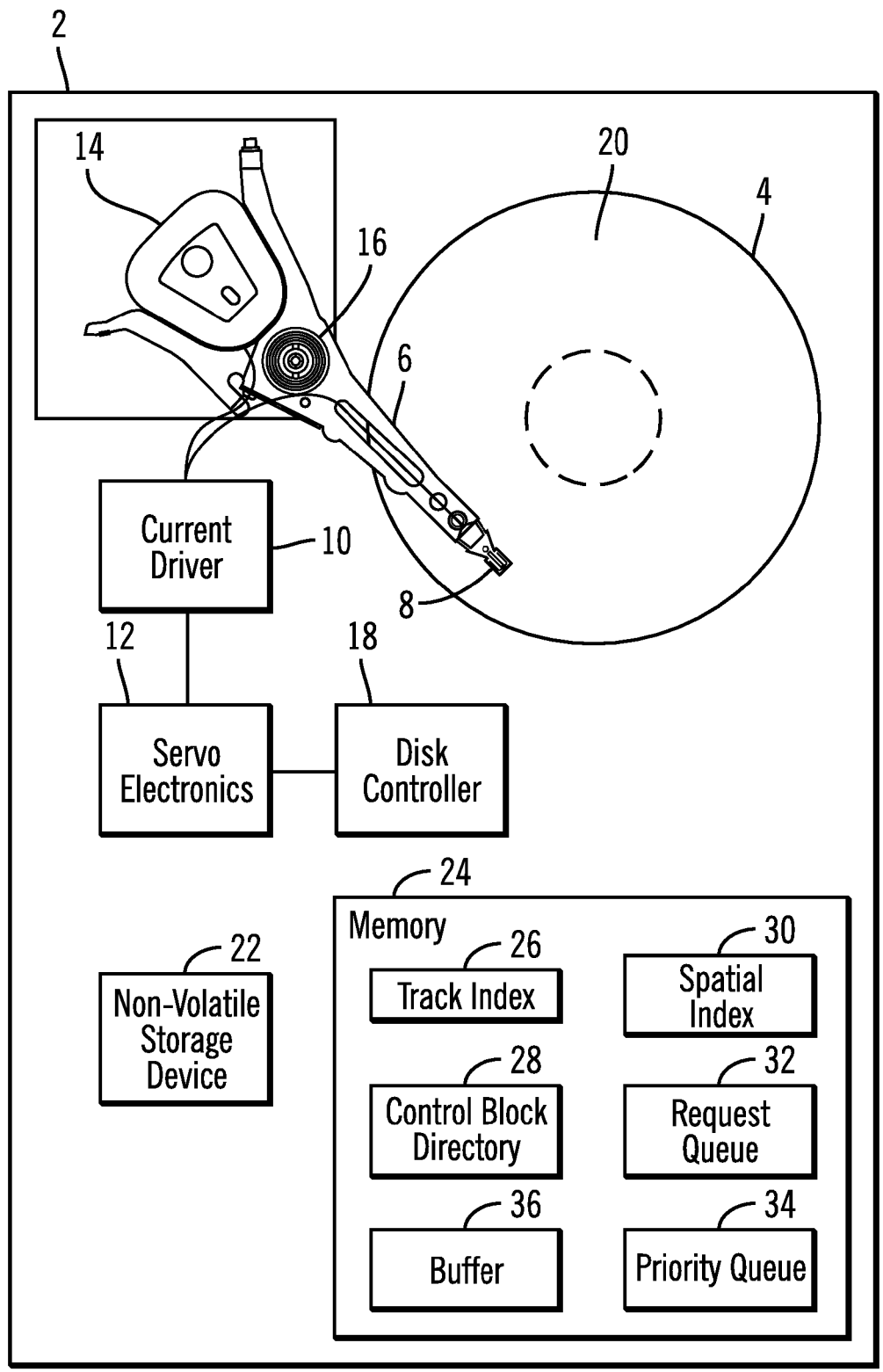
FIG. 1 illustrates an embodiment of a hard disk drive.

FIG. 1 illustrates a disk drive system 2, including one or more rotating disks 4 (only one is shown), an actuator assembly 6 to move a head assembly 8 across the disk 4 surface. The disk drive system 2 further includes a current driver 10 that converts the digital signal of a calculation from servo electronics 12 or drive controller 18 to actual current that is applied to a voice coil motor (VCM) 14. The VCM 14 comprises a coil that sits between two magnets. The current driver 10 applies current to the VCM 14 to cause the coil to react and move through a magnetic field to move the actuator 6.

In certain implementations, the head 8 is a magnetoresistive (MR) head device. However, in alternative implementations, the head 8 may be constructed of other materials known in the art. The servo electronics 12 provides a closed loop feedback system to insure that the head follows the tracks accurately and to control smooth transitions when the head "seeks" from one track location to another track. The servo electronics 12 calculates the position error signal (PES) from the actual position data and from pre-recorded servo information either on a dedicated servo disk or on servo sectors interspersed among the data sectors on the disk. The servo electronics 12 uses the servo information to determine PES, which is the signal proportional to the difference between the ideal center line tracking and the actual positions of the head assembly 8. The servo electronics 12 may then calculate a corrective position signal based on the PES. The actuator 6 pivots around a shaft 16 in response to the torque produced by the VCM 14.

Each disk 4 has a magnetic recording surface 20 on which data may be recorded and read using the read/write head 8 unit. The recording surface 20 may be on both sides of the disk 4 or on only one side.

The disk controller 18 manages read/write operations and controls other disk operations, including sending control signals to the servo electronics 12 to control the actuator 14. The disk controller 18 may cache modified data for write requests in a non-volatile storage device 22, which may comprise a flash memory device comprised of solid state electronics. The disk controller 18 utilizes a memory 24 to maintain information to manage I/O operations, including a track index 26 providing an index of tracks in the non-volatile storage device 22 to control blocks 50 (FIG. 2) in a control block directory 28; a spatial index 30 providing a spatial ordering of the modified tracks in the non-volatile storage 22 based on the physical locations in the disks 4 at which the modified tracks are stored; and a request queue 32 in which read and write requests are queued. The disk controller 18 adds read and write request to the request queue 32 and accesses read and write requests from the request queue 34 to execute against the recordable surface 20. The memory 24 may further include a priority queue 34 to queue higher priority read or write requests to execute at a higher priority than requests queued in the request queue 32.

A buffer 36 may temporarily buffer read and write input requests and data being returned to a read request. The buffer 36 may also be used to temporarily buffer modified tracks for write requests to process at a higher priority and not maintained in the non-volatile storage device, such as for sequential write requests and their modified data which may be written to the disk 4 and bypass the non-volatile storage device 22. The buffer 36 may be in a separate device than the non-volatile storage device 22 and may comprise smaller storage space than available in the non-volatile storage device 22. Alternatively, the buffer 36 may be entirely or partially implemented in the non-volatile storage device 22.

In certain embodiments, read requests in the queues 32 and 34 are read based on a temporal order, or order in which they were added to the queues 32 and 34, where the queues 32 and 34 may comprise Least Recently Used (LRU) queues. Destage requests are added to the request queue 32 based on a temporal order in which write requests are received. However, modified tracks in the non-volatile storage device 22 are destaged based on the spatial index 30, so when a destage request is processed in the request queue 32, based on the temporal order in which the destage request was added to the request queue 32, the modified tracks in the non-volatile storage device 22 are selected using the spatial index 30 based on the current position of the read/write head 8. The disk controller 18 may also generate destage requests to destage modified tracks in the non-volatile storage device 22 to free space in the non-volatile storage device.

Some or all of the functions of the disk controller 18 may be implemented as code executed by a processor on a circuit board including the drive 2 components. Alternatively, some or all of the functions of the disk controller 18 may be implemented in an ASIC within the housing of the disk drive 2.

In certain embodiments, the non-volatile storage device 22 may comprise a flash memory device, comprised of solid state electronics, implemented on the disk drive 2 circuit board within the disk drive 2 enclosure. For instance, the non-volatile storage device 20 may comprise an 8 GB flash memory device. The non-volatile storage device 22 may comprise a faster access storage media than the disk 4.

In certain embodiments, the areal density of bits per unit of storage may be commensurate with current areal densities for magnetic disks, such as at least 200 gigabits per inch or recently experienced densities of 625 gigabits per inch. However, in described embodiments, to increase the amount of available storage on the disk surface 20, a larger diameter disk may be used for each platter. Current disk diameters are 2.5 inches and 3.5 inches. In the current art, the disk drive manufacturers build smaller diameter disks to reduce the seek time to seek to cylinders on the disk surface, i.e., move the head 8 across the disk surface.

However, in the described embodiments, larger diameter disks may be used, such as having a disk size greater than 3.5 inches, e.g., 5.25", 7", 9", 14", which are sizes associated with older generation disks. With the described embodiments, the use of the non-volatile storage device 22 to cache write requests can offset performance issues due to increased seek time related to the larger diameter disks because read requests may be serviced from the cached modified tracks in the non-volatile storage device 22, which has a faster access time than the disks 4. Access time to frequently accessed read requests may be reduced by caching frequently accessed reads in the computer system accessing the disk drive 2.

Further, described embodiments may implement a slower RPM (rotations per minute) at which the disks 4 are rotated to allow for greater track densities on the recording surface 20. In certain embodiments, the RPMs used in the disk drive 2 may be less than 5400 RPMs, such as 3600, etc. Current disk drive systems use faster RPMs for their disks to improve performance by improving the latency time to reach a track or sector within a cylinder.

However, in the described embodiments, the disk may be rotated at a slower speed, such as less than 5400 RPMs, because the use of the non-volatile storage device 22 to cache write requests can offset performance issues related to increased latency time because read requests may be serviced from the cached modified tracks in the non-volatile storage device 22, which has a faster access time than the disks 4. Further, access time to frequently accessed read requests may be reduced by caching frequently accessed reads in the computer system accessing the disk drive 2.

Write delays the could be experienced by using a larger diameter disk 2 and/or slower rotational speed (RPMs) for the disk 2. Described embodiments offset any write delays by using larger disks with slower rotational speeds by returning complete to the write request in response to the modified tracks being cached in the non-volatile storage device 22, before being recorded on the recording surface 20.

In further embodiments, more than five disk platters may be used to further increase the amount of available storage space. In the current art, the number of disk platters is limited to 5 or fewer to minimize the amount of vibrations resulting from the faster rotating disks, i.e., fewer disks rotating at faster RPMs, produces fewer vibrations that may produce undesirable head variations and tracking errors. However, in the described embodiments, vibrations may be mitigated as the number of disk platters increases because the disks may be rotated at a slower RPM rate, e.g., less than 5400, due to the non-volatile storage device 18 (e.g., flash memory) mitigating performance degradation associated with slower RPMs or greater disk diameters.

Figure 2:
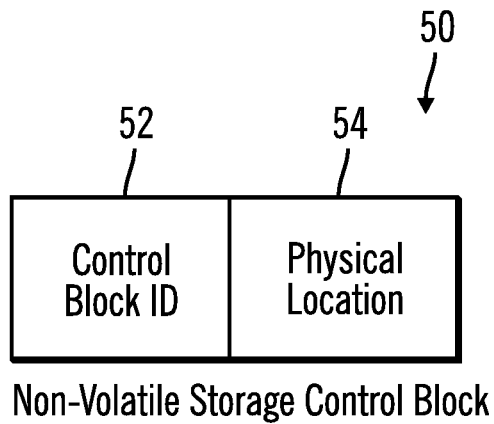
FIG. 2 illustrates an embodiment of a non-volatile storage cache control block.

FIG. 2 illustrates an embodiment of a non-volatile storage control block 50 entry in the non-volatile storage control block directory 28, including a control block identifier (ID) 52 and a physical location 54 at which the track is located, such as an LSA location if the track is stored in a LSA on the non-volatile storage device 20.

Figure 3:
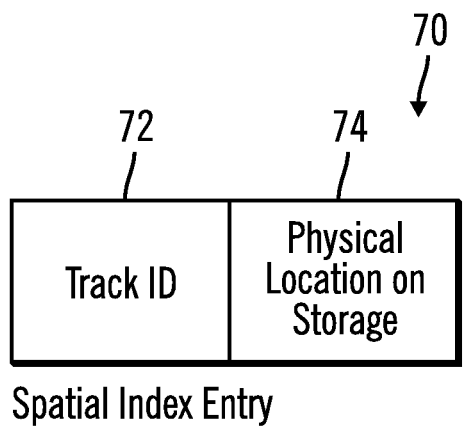
FIG. 3 illustrates an embodiment of a spatial index entry.

FIG. 3 illustrates a spatial index entry 70 in the spatial index 30 including a track identifier 72 of a track in the non-volatile storage device 20 and the physical location 24 of where the track is stored in the disks 4, such as a cylinder, platter number, angular position on the cylinder, etc.

Figure 4:
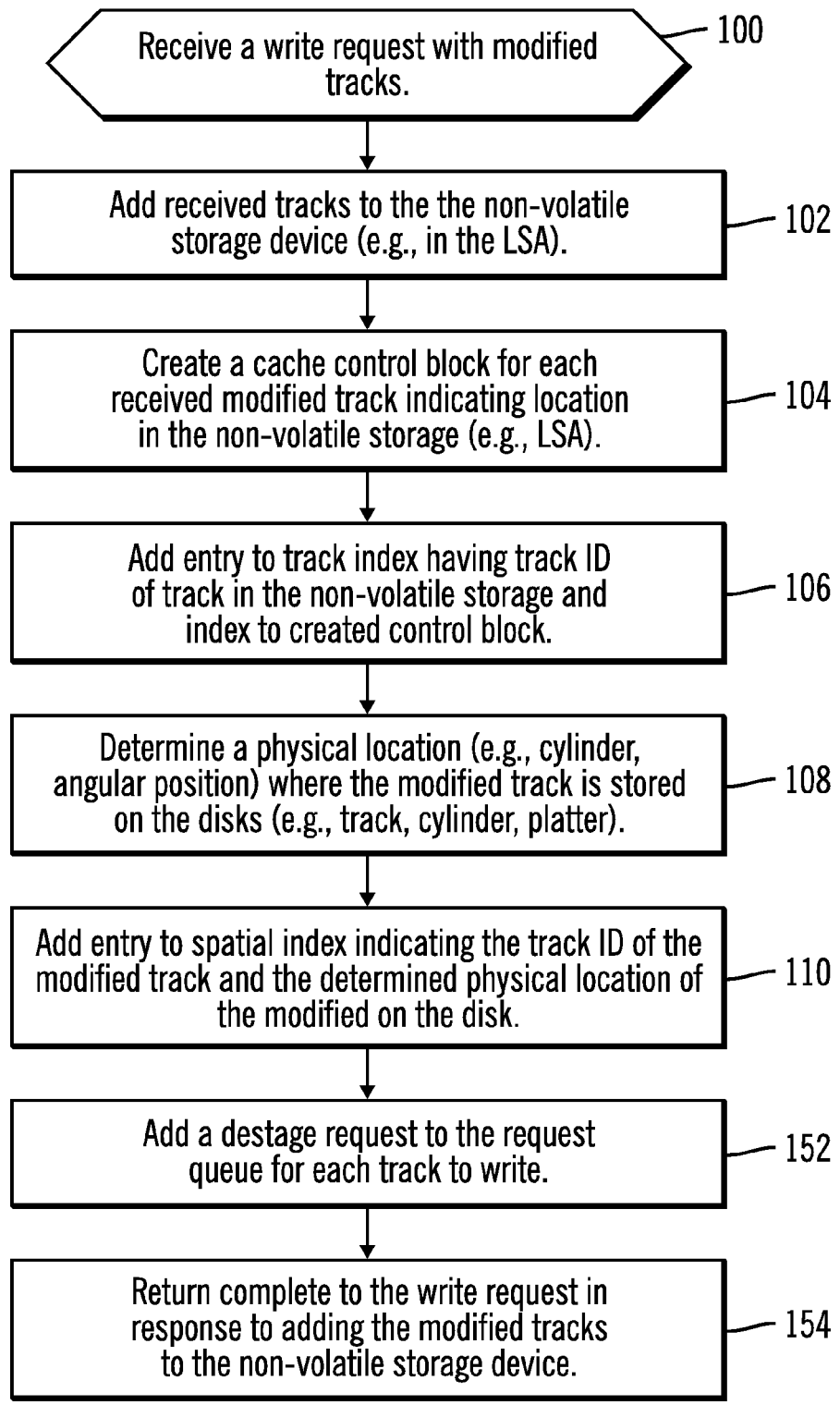
FIG. 4 illustrates an embodiment of operations at the disk drive to process a write request.

FIG. 4 illustrates an embodiment of operations performed by the disk controller 18 to process a write request with modified tracks for one of the disks. Upon receiving (at block 100) the write request, the disk controller 18 adds (at block 102) the received modified tracks to the non-volatile storage device 22. In one embodiment, the tracks may be added to a Log Structure Array (LSA) in the non-volatile storage device 22 or stored in another format in the device 22. In an LSA, tracks are written in a sequential order as received, thus providing a temporal ordering of the tracks written to the non-volatile storage device 22. In a LSA, later versions of tracks already present in the LSA are written at the end of the LSA. In alternative embodiments, the non-volatile storage device 22 may store data in formats other than in an LSA.

The disk controller 18 creates (at block 104) a cache control block 50 (FIG. 2) for each received modified track indicating a location in the non-volatile storage device 22 (e.g., LSA location) of the modified track. An entry is added (at block 106) to the track index 26 having the track ID of modified track in the non-volatile storage device 22 and index to the created control block 50.

The disk controller 18 determines (at block 108) a physical location of where the modified track is stored on the recordable surface 20 of one disk 4, such as a cylinder, platter, track, sector, etc. Further, in an additional embodiment, the determined physical location included in the spatial index 30 may also include an angular position on the cylinder of the modified track. The disk controller 18 adds (at block 110) an entry 70 (FIG. 3) to the spatial index 26 indicating the track ID 72 of the modified track and the determined physical location 74 of the modified on the disk 4. The disk controller 18 further adds (at block 112) a destage request to the request queue 32 for each track to write. This destage request may not identify the specific modified track to demote, which is later determined using an algorithm to reduce the total access time to perform the write. Write complete is returned (at block 154) to the write request in response to adding the modified tracks to the non-volatile storage device. In an alternative embodiment, write complete may be returned upon writing the modified tracks to the recordable surface 20.

Figure 5:
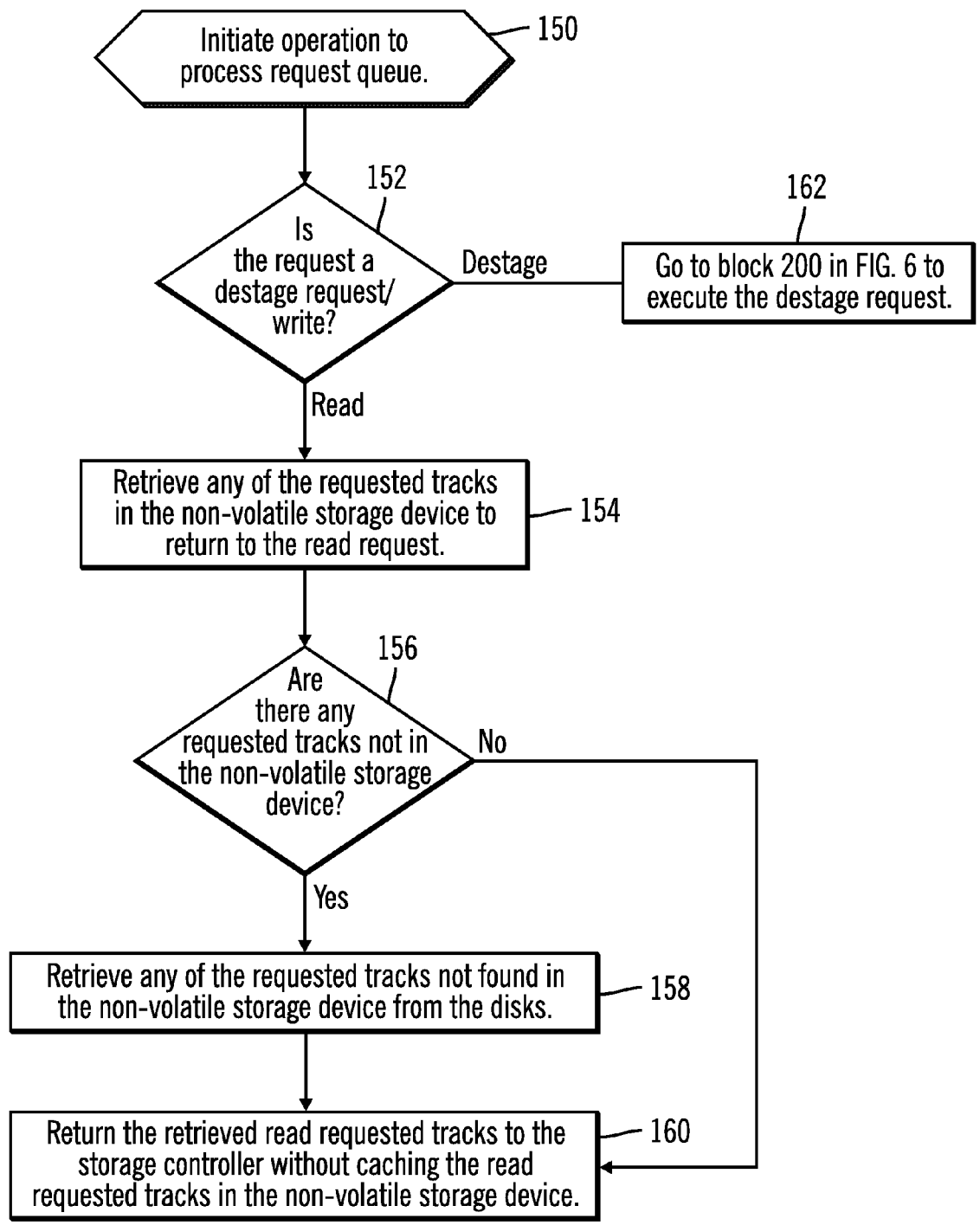
FIG. 5 illustrates an embodiment of operations at the disk drive to process the request queue.

FIG. 5 illustrates an embodiment of operations performed by the disk controller 18 to process the request queue 32 which may be continually repeated while requests are queued in the request queue 32. Upon initiating (at block 150) an operation to process the request queue 32, if (at block 152) the request is a read request, then the disk controller 18 retrieves (at block 154) any of the requested tracks in the non-volatile storage device 22 to return to the read request. If (at block 156) there are requested tracks not in the non-volatile storage device 22, then disk controller 18 retrieves (at block 158) any of the requested tracks not found in the non-volatile storage device 22 from the disks 4. After retrieving all the requested tracks (from block 158 or he no branch of block 156), the disk controller 18 returns (at block 160) the retrieved read requested tracks to the initiator of the read request, such as a storage controller, computer system, etc., without caching the read requested tracks in the non-volatile storage device 22. In an alternative embodiment, read requested tracks may be cached in the non-volatile storage device 22.

Figure 6:
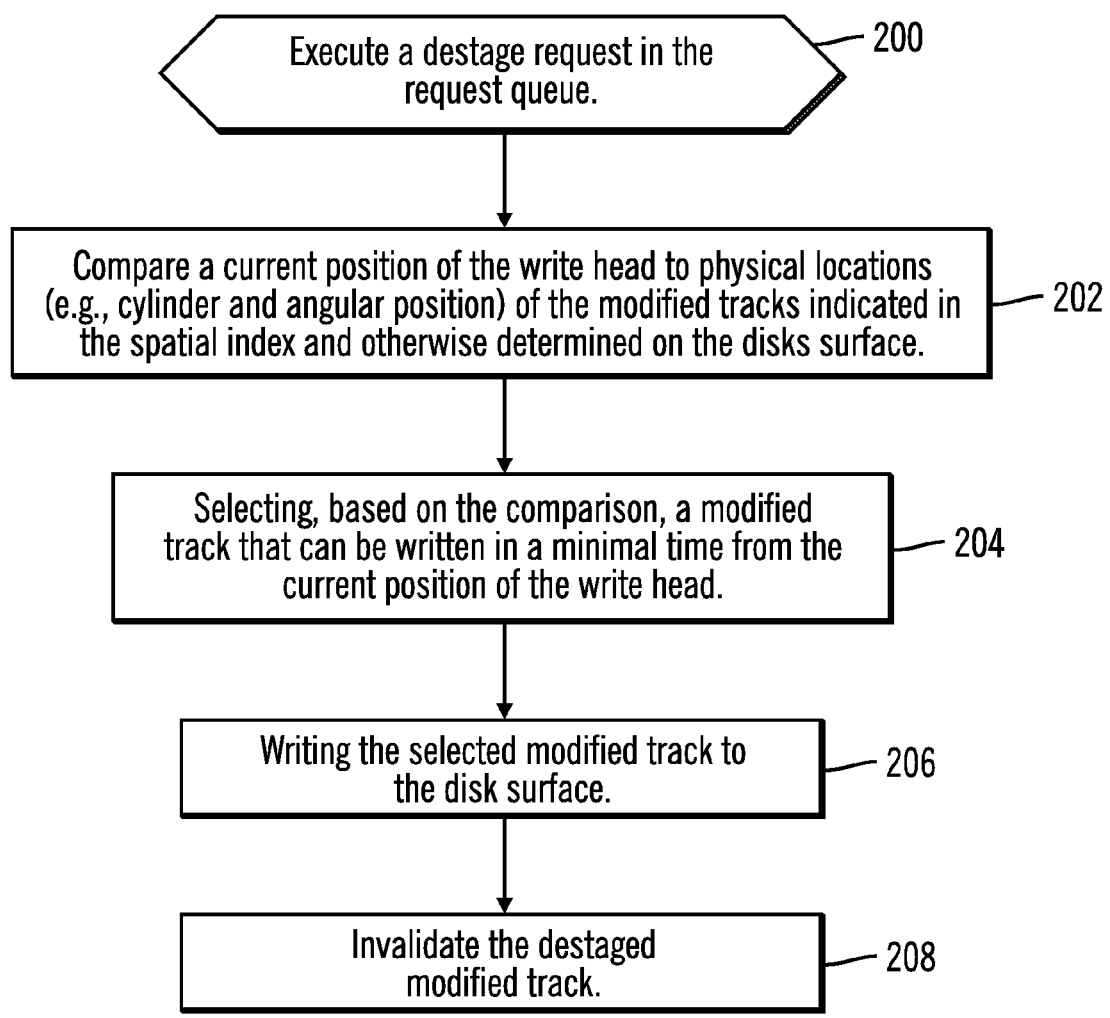
FIG. 6 illustrates an embodiment of operations at the disk drive to process a destage request in the request queue.

If (at block 152) the request is a destage/write request, then control proceeds (at block 162) to block 200 in FIG. 6 to process the destage/write request. To execute (at bock 600) the destage request, the disk controller 18 compares (at block 202) a current position of the write head 8 with respect to the disk surface 20 to physical locations (e.g., cylinder, angular position, disk platter) of the modified tracks indicated in the spatial index 30 and otherwise determined on the disk 4. The spatial index 30 may include all the necessary information to determine the track in closest temporal proximity to the write head, such as the cylinder, angular position (i.e., sector), and disk platter of the track to write, or may include only some of the information, e.g., the cylinder, and the rest of the physical location information needed may be determined from the servo electronics 12. The disk controller 18 selects (at block 206), based on the comparison, a modified track that can be written in a minimal time from the current position of the write head 8 and writes (at block 206) the selected modified track to the recording surface 20. The destaged modified tracks are invalidated (at block 208).

In certain embodiments, to determine the modified track that can be accessed in the minimal time from the current position of the write head 8, the disk controller 18 may analyze the cylinder and angular position of the modified tracks in the spatial index 30 to estimate the times for the write head 8 to seek to the cylinders of the modified tracks and rotate the disk under the write head 8 to reach the angular positions of the modified tracks. The disk controller 18 may then select a modified track having a minimal of the estimated access times. In embodiments of multiple disk platter 4 and multiple read/write heads 8 and arms 6 for each platter, the disk controller 18 may determine the estimated time to seek and rotate to each modified track on each disk platter from the current position of the write heads to select a modified track having the minimal estimated time to access across the disk platters.

In addition, if the disk controller 18 may determine that a destage operation needs to be performed to destage modified tracks in the non-volatile storage device 22 to the disk surface 20 to free space in the non-volatile storage device 22. In such case, the disk controller 18 may interrupt the processing of the requests in the queues 32 and 34 to execute the destage operation.

Described embodiments provide a non-volatile storage device 22, such as a flash memory, in a disk drive to allow caching of modified tracks, where read requests to tracks can be returned from the non-volatile storage device 22 before they are destaged to disk 4 to improve read performance. Further, write performance may be improved by returning complete to the write in response to the write being stored in the non-volatile storage device 22 before being destaged to the disk 4.

Described embodiments provide solutions to increasing the storage capacity of disk drives without substantial effects on performance by increasing the disk diameter, reducing the disk rotational speed (RPMs), and increasing the number of platters. In the described embodiments, the disadvantages associated with greater disk diameter, slower RPMs to rotate the disk, and additional platters are mitigated due to the use of the non-volatile storage device 22. The non-volatile storage device 22 allows the caching of modified data to improve the completion rate for write requests by returning complete in response to writing the data to the faster access non-volatile storage device 22 and to improve the read rate by allowing modified tracks to be read from the faster access non-volatile storage device 22. Further, reducing the rotational speed allows for greater disk density, thus allowing further increases in the storage capacity of the disk drive 2.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A disk drive assembly having a housing, comprising:
   at least one disk platter having at least one recordable disk surface having an areal density of at least 200 gigabits per square inch, wherein either a diameter of the at least one disk platter is greater than 3.5 inches or the at least one disk platter rotates at less than 5400 RPMs;
   an actuator assembly for controlling a movement of a read/write head with respect to the at least one disk platter to read and write tracks of data with respect to the at least one disk surface;
   a non-volatile storage device for caching modified tracks from write requests to write to the at least one disk surface on the at least one disk platter; and
   a disk controller for processing read and write requests and caching modified tracks in the non-volatile storage device to later destage to the at least one disk surface, wherein the at least one disk platter, the actuator assembly, the non-volatile storage device, and the disk controller are within the housing.

2. The disk drive assembly of claim 1, wherein the disk controller further performs:
   receiving a read request for requested tracks on the at least one disk surface;
   determining whether the requested tracks are in the non-volatile storage device; and
   accessing the determined requested tracks from the at least one disk surface to return to the read request.

3. The disk drive assembly of claim 1, wherein the disk controller further performs:
   receiving a write request having modified tracks to write to the disk surface;
   caching the modified tracks of the received write request in the non-volatile storage device; and
   returning complete to the system initiating the write request in response to caching the modified tracks of the received write request in the non-volatile storage device.

4. The disk drive assembly of claim 1, wherein the non-volatile storage device comprises a flash memory device.

5. The disk drive assembly of claim 1, wherein the at least one disk platter comprises more than 5 disk platters, and wherein each disk platter has one or two disk surfaces.

6. The disk drive assembly of claim 1, wherein the diameter of the at least one disk platter is greater than 3.5 inches and the at least one disk platter rotates at a rate of less than 5400 RPMs.

7. The disk drive assembly of claim 1, wherein the areal density of the at least one disk surface is at least 625 gigabits per square inch.

8. The disk drive assembly of claim 1, wherein the non-volatile storage device is a faster access device than accessing the disk surface.

9. A computer program product for managing data in a disk drive receiving read requests and write requests from a system with respect to tracks stored on at least one recordable disk surface in at least one disk platter in a housing of the disk drive, the computer program product comprising a computer readable storage medium having computer readable program code embodied therein that executes to perform operations, the operations comprising:
   accessing the at least one disk platter, wherein the at least one recordable disk surface has an areal density of at least 200 gigabits per square inch, wherein either a diameter of the at least one disk platter is greater than 3.5 inches or the at least one disk platter rotates at less than 5400 RPMs;
   controlling a movement of a read/write head with respect to the at least one disk platter to read and write tracks of data with respect to the at least one disk surface;
   caching in a non-volatile storage device in the disk drive modified tracks from write requests to write to the at least one disk surface on the at least one disk platter; and
   caching modified tracks in the non-volatile storage device to later destage to the at least one disk surface, wherein the at least one disk platter, the read/write head, the non-volatile storage device, and the disk controller are within the housing of the disk drive.

10. The computer program product of claim 9, wherein the operations further comprise:
    receiving a read request for requested tracks on the at least one disk surface;
    determining whether the requested tracks are in the non-volatile storage device; and
    accessing the determined requested tracks from the at least one disk surface to return to the read request.

11. The computer program product of claim 9, wherein the operations further comprise:
    receiving a write request having modified tracks to write to the disk surface;
    caching the modified tracks of the received write request in the non-volatile storage device; and
    returning complete to the system initiating the write request in response to caching the modified tracks of the received write request in the non-volatile storage device.

12. The computer program product of claim 9, wherein the non-volatile storage device comprises a flash memory device.

13. The computer program product of claim 9, wherein the at least one disk platter comprises more than 5 disk platters, and wherein each disk platter has one or two disk surfaces.

14. The computer program product of claim 9, wherein the diameter of the at least one disk platter is greater than 3.5 inches and the at least one disk platter rotates at a rate of less than 5400 RPMs.

15. The computer program product of claim 9, wherein the areal density of the at least one disk surface is at least 625 gigabits per square inch.

16. The computer program product of claim 9, wherein the non-volatile storage device is a faster access device than accessing the disk surface.

* * * * *